(12) United States Patent
Chaniot et al.

(10) Patent No.: US 7,717,369 B2
(45) Date of Patent: May 18, 2010

(54) POWER PLANT FOR A ROTARY WING AIRCRAFT

(75) Inventors: Daniel Chaniot, Marignane (FR); François-Xavier Gaulmin, Salon de Provence (FR); Lionel Iraudo, Marseilles (FR)

(73) Assignee: Eurocopter, Marignane (FR)

( * ) Notice: Subject to any disclaimer, the term of this patent is extended or adjusted under 35 U.S.C. 154(b) by 235 days.

(21) Appl. No.: 11/790,976

(22) Filed: Apr. 30, 2007

(65) Prior Publication Data

US 2008/0173768 A1    Jul. 24, 2008

(30) Foreign Application Priority Data

Apr. 28, 2006    (FR) .................................. 06 03869

(51) Int. Cl.
*B64D 35/08* (2006.01)
(52) U.S. Cl. ...................................... 244/55; 244/17.11
(58) Field of Classification Search ............... 244/53 B, 244/53 R, 54, 55, 17.11; 137/15.1, 15.2
See application file for complete search history.

(56) References Cited

U.S. PATENT DOCUMENTS

| | | | |
|---|---|---|---|
| 3,002,710 A | 10/1961 | Marchetti et al. | |
| 3,255,825 A | 6/1966 | Mouille et al. | |
| 4,216,924 A * | 8/1980 | Fradenburgh | 244/17.11 |
| 4,456,458 A * | 6/1984 | Gilbertson | 55/306 |
| 4,531,694 A | 7/1985 | Soloy | |
| 4,713,933 A * | 12/1987 | Bandera | 60/39.5 |
| 4,772,497 A | 9/1988 | Maasola | |
| 5,697,394 A * | 12/1997 | Smith et al. | 137/15.1 |
| 6,260,800 B1 * | 7/2001 | Snell | 244/53 R |
| 6,302,356 B1 * | 10/2001 | Hawkins | 244/17.11 |
| 7,192,462 B2 * | 3/2007 | Stelzer et al. | 55/306 |

FOREIGN PATENT DOCUMENTS

| | | |
|---|---|---|
| FR | 2 859 761 | 3/2005 |
| GB | 864540 | 4/1961 |

* cited by examiner

*Primary Examiner*—Michael R Mansen
*Assistant Examiner*—Brian M O'Hara
(74) *Attorney, Agent, or Firm*—Young & Thompson

(57) ABSTRACT

The present invention relates to a power plant (18) comprising at least one turboshaft engine (8) behind a gearbox (7) for driving a rotor (3) of a rotary wing aircraft (1), the air inlet body (20) of the engine (8) having a first end (21) opening out into the ambient atmosphere in front of the engine, and a second end (22) connected to the engine at the rearmost portion thereof.

12 Claims, 1 Drawing Sheet

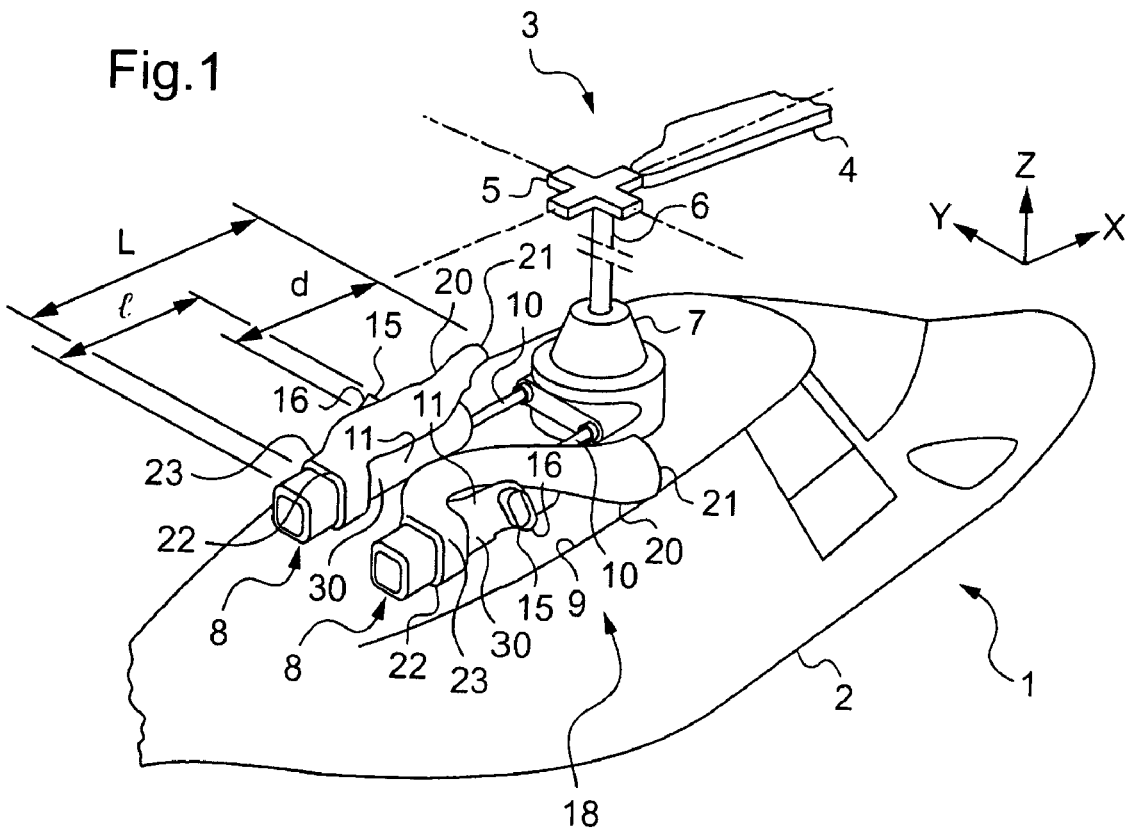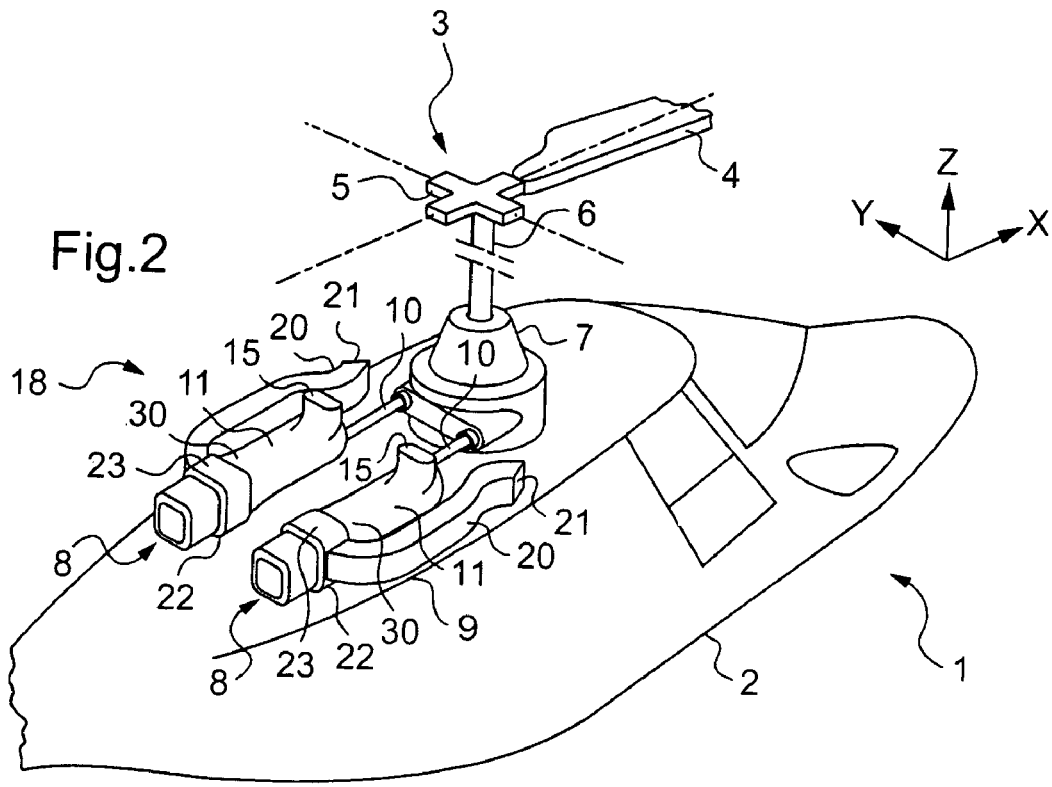

POWER PLANT FOR A ROTARY WING AIRCRAFT

The present invention relates to a power plant for rotary wing aircraft, in particular helicopters.

FIELD OF THE INVENTION

It relates more particularly to helicopters in which the main rotor(s) must necessarily be driven in rotation by a source of drive power, generally from turboshaft engines which have been developed to achieve considerable technical advances, including:

- reduced specific weight making it possible to increase payload;
- parts that are essentially rotary, thereby reducing vibrational phenomena;
- simplification of the power plant, e.g. because of its generally smaller size;
- driving toque that varies little in the vicinity of its working speed; and
- making piloting simpler by incorporating a regulator that enables the speed of rotation to be maintained at a value set by the pilot.

BACKGROUND OF THE INVENTION

At present, the engines used for helicopters (sometimes referred to below as "aircraft") are usually of the "free turbine" type (also known as the "power wheel" type) where power is taken from a low-pressure stage of the turbine, which stage is mechanically independent of the compressor installation of the high-pressure stage of the turbine.

In principle, a turboshaft engine has a speed of rotation lying in the range 30,000 revolutions per minute (rpm) to 50,000 rpm, with a speed of only about 6,000 rpm at the outlet from the incorporated gearbox that is generally associated therewith.

Unfortunately, the main rotor of a helicopter has a speed of rotation lying in the range 300 rpm to 400 rpm, such that a special speed-reducing gearbox is essential on all helicopters. That is why a main gearbox (MGB) is always installed between the turboshaft engine(s) and the main rotor: which MGB is naturally associated with transmission means.

In most cases, the helicopter is also provided with a tail rotor for controlling yaw movements of the aircraft. Such a helicopter then has a transmission shaft between a special take-off of the MGB and a rear gearbox providing angle transmission and a reduction in speed to about 2,000 rpm, for example, to deliver power to the tail rotor.

It is important to observe that terms such as "front" and "rear" relating to an element of a helicopter designate respectively the portion of that element situated towards the cockpit (i.e. at the leading end of the aircraft), and the portion situated towards the tail boom and the tail rotor.

Under such conditions, the invention relates to a power plant having one or more engines on a helicopter, located behind the MGB, even though the architecture of such engines predisposes them for being installed in front of the MGB. Like the configuration of the Makila® 1A or 1A1 turboshaft engine developed by the supplier Turbomeca and fitted in particular to the helicopter known under the trademark Super Puma® in the name of the Applicant, it must be understood that such an engine, disposed in front of the MGB presents successively from the front towards the rear of the helicopter the following members:

- a gas generator comprising in succession:
  - a short air inlet;
  - a three-stage axial compressor connected to a rear centrifugal compressor by the shaft of the gas generator;
  - a combustion chamber; and
  - a two-stage turbine of the gas generator;
- a free turbine comprising a two-stage working turbine driving towards the rear a power transmission shaft or turbine drive shaft connected to specific inlet of the MGB; and
- a hot gas ejection nozzle directed laterally and outwards from the engine compartment.

In a Super Puma® helicopter, the power plant comprises two Makila® 1A or 1A1 engines, each being installed in an individual compartment that is fireproof, ventilated, and drained.

More generally, the solutions that have been implemented in the past correspond to two main architectures, namely:

- the configuration of the first solution comprises one or more engines mounted in front of the MGB like the installation of the Makila® 1A or 1A1 engine on the Super Puma® helicopter as described above; or
- the configuration of the second solution comprises one or more engines behind the MGB, which engines are specially designed for a disposition in which there are to be found, after an MGB, and in succession from the front towards the rear of the rotary wing aircraft:
  - the turbine drive shaft driving the MGB, which shaft:
    - either goes towards the front of the helicopter through the air inlet, passing through the gas generator (and its compressor) and is driven by the free turbine, as applies for example in the L.T.S. engine from the supplier Lycoming that is fitted to the Ecureuil® AS 350® or AS 355® helicopters of the Applicant;
    - or else lies parallel to the engine, but outside it, and is driven by the free turbine, as applies for example to the Arriel® engine that can also be fitted as an alternative solution to Ecureuil® AS 350® or AS 355® helicopters;
  - the gas generator;
  - the free turbine; and
  - the nozzle for exhausting hot gas, constituting the element of the power plant that is situated furthest towards the rear of the helicopter.

Unfortunately, present certification regulations no longer enable a new civilian helicopter to be certified without a significant increase in weight if the engine(s) is/are installed in front of the MGB, i.e. with the configuration of the first solution described above. Under such circumstances, it is now required to shield the engine in order to protect the flight controls (servo-controls, swashplates, blade pitch links, . . . ) from the possibility of the turbine bursting, these flight controls being in the immediate proximity of the turbine and being distributed in particular around the rotor shaft as driven by the MGB.

It is important to observe that that is why engine manufacturers have developed engines complying with the second solution described above. As already mentioned, it will be understood that those engines correspond to definitions specially adapted for installing engines behind an MGB so that the air inlet is towards the front of the helicopter and the nozzle towards the rear. The examples relating to the L.T.S. engine with a turbine drive shaft passing through the gas generator (and the compressor) or relating to the Arriel® engine with a turbine drive shaft parallel to and outside the engine clearly illustrate the special functional arrangements that are needed in association with that second solution.

Engines suitable for that second solution are relatively recent, but they are more expensive than those suitable for the first solution, because of the particular technical problems inherent to their special disposition behind an MGB.

Unfortunately, the cost of a power plant becomes even greater for a twin-engine helicopter that is intended to be inexpensive to purchase.

A third solution consists in fitting a helicopter with engines located behind the MGB, but using engines that are theoretically intended to be installed in front of the MGB.

One such solution has been put into practice in the SA 321 Super Frelon® helicopter of the Applicant.

In that configuration, the helicopter is provided with three Turmo® III C3 engines from the supplier Turbomeca, two of them being disposed side by side using the first solution, while the third engine is located behind the MGB, the other way round to the first two engines, i.e. in the following configuration:

- a hot gas exhaust nozzle behind the MGB;
- a free turbine drive shaft connecting it to the rear of the MGB;
- a gas generator; and
- an air inlet, constituting the rearmost element of the power plant.

It should be observed that the positioning of the third engine presents a drawback due to the air inlet being located behind the nozzle. As a result, particularly in forward flight, it will readily be understood that at least some of the hot gas coming from the nozzle can be fed into the air inlet. This constitutes a phenomenon known as "recirculation" and that has a severe effect on performance, i.e. the power of an engine suffering therefrom. Naturally, this loss of power, which is acceptable in a helicopter with surplus power such as the Super Frelon®, is no longer acceptable for a single-engine or twin-engine helicopter, particularly if the helicopter is to be inexpensive to purchase.

In this context, it should be observed that an inverse configuration in the manner of the third engine of the Super Frelon® is to be found in document GB-0 864 540. In that configuration, the air inlet is located in the wing of an airplane, above the nozzle situated upstream therefrom. In that configuration likewise there is a possibility of some of the hot gas penetrating into the air inlet, particularly when the wing is at an angle of incidence, and in spite of the presence of the propeller that provides a slipstream going from front to rear.

SUMMARY OF THE INVENTION

More precisely, the invention relates to installing one or more turboshaft engines in a configuration identical to the preceding configuration, behind the MGB, so as to provide in succession from the front of the helicopter towards the rear:

- the drive shaft of the free turbine;
- the nozzle;
- the free turbine; and
- the gas generator whose air inlet constitutes the rearmost member of the power plant and in a novel disposition.

This disposition differs from the prior art as explained below and for reasons that are entirely specific, likewise explained below.

The power plant of the invention comprises at least one turboshaft engine for driving a rotary wing aircraft rotor via an MGB, the engine being disposed substantially in the longitudinal direction of the aircraft and behind the MGB relative to the longitudinal direction of axis X, such that:

- the MGB is driven in rotation by a power transmission shaft connected firstly to the free turbine, and secondly passing through a hot gas exhaust nozzle;
- the free turbine is driven in rotation by a gas generator likewise situated behind said free turbine; and
- the gas generator is fed with air by an air inlet body;

is remarkable in that the air inlet body is substantially parallel to the engine so that firstly its first portion opening out into the ambient atmosphere is situated in front of the hot gas exhaust nozzle, substantially in the transverse plane containing the axis of the rotor of said aircraft, and secondly its second end corresponding to its connection to the engine is situated substantially in the zone of the engine that is rearmost in the longitudinal direction.

It is recalled that according to the invention the engine used under such conditions is of the same type as those installed in front of an MGB, i.e. without any special mechanical adaptation (unlike the solutions relating for example to the L.T.S. engine or to the ARRIEL® engine for the ECUREUIL® helicopter), and consequently an engine that is as simple and inexpensive as possible, both for purchase and in maintenance, in particular.

Advantageously, the air inlet body of the engine is elongate so that its length is greater than that of the engine. Such an air inlet body is also defined as being a long air inlet body.

When an engine is installed behind the MGB of a helicopter, with its air feed being provided at the rear end of the engine by means of an elongate air inlet body having a first end opening out into the ambient atmosphere in front of the hot gas exhaust nozzle, the first advantage of that disposition lies, as explained above, in minimizing or even eliminating any recirculation of hot gas, i.e. any delivery of hot gas into the air inlet.

Another advantage of implementing a long air inlet body, while the nozzle remains short as in conventional solutions, lies in the following pair of observations:

- firstly, the temperature of the air in the air inlet body is that of the ambient atmosphere, so it is possible to make such an air inlet body out of composite materials such as fabrics made of glass fibers or other analogous materials: this leads to a saving in weight (the density of the finished product lies in the range about 2500 kilograms per cubic meter ($kg/m^3$) to 2800 $kg/m^3$), and to a saving in cost. This would not be true if the materials used were suitable for a nozzle that is subjected to very high temperatures, namely stainless steel which has a density of 7800 $kg/m^3$ or titanium, which is lighter than stainless steel (density 4500 $kg/m^3$), but more expensive and more difficult to work; and
- secondly since the speed of the air in the inlet body is relatively low, the flow section of the air inlet is small, thereby also contributing to reducing the weight of the air inlet body and once again its recurrent cost.

It is also appropriate to observe a particular advantage relating to a long air inlet body that is due to the excellent reliability of such equipment. Unlike a hot gas exhaust nozzle that is subjected to very high temperatures and to vibration that leads to cracking and to breaks, a long air inlet body operates under good conditions and consequently presents a high level of reliability that is compatible with the reliability of the engine to which it is fitted.

The distance between firstly the end of the air inlet body that opens out into the ambient atmosphere in front of the hot gas exhaust nozzle, and secondly the outlet of said nozzle is also an important parameter for defining the power plant of the invention. Advantageously, this distance is of the order of 1.5 meters (m) for an engine installed on a helicopter weighing 3 (metric) tonnes to 15 tonnes, for example. This distance corresponds substantially to the actual length of the engine. In this way, the above-described risk of recirculation is reduced further or even eliminated.

Advantageously, the second end of the air inlet body where it is secured to the engine can include a plenum chamber for the drawn-in air. This plenum chamber is substantially annular in shape and surrounds the engine and its own air inlet orifice.

Furthermore, the mass flow rate of the drawn-in air is constant through the engine, while the volume flow rate increases considerably in the hot gas ejected through the nozzle because the ejection speed of said gas is very high. Consequently, the section of the nozzle is greater than that of the air inlet body so as to minimize head losses and consequently guarantee good performance for such an engine.

The invention also envisages placing the air inlet body and the nozzle in the transverse plane of the rotary wing aircraft in two different ways:
- in a first variant, the air inlet body is substantially in a high position above the engine, such that the nozzle opens out substantially laterally and towards the outside of the rotary wing aircraft, thereby facilitating access to the engine and maintenance thereof; or else
- in a second variant, the air inlet body is disposed substantially laterally, either towards the outside of the aircraft, or else towards the inside (a solution that is possible on a twin-engine aircraft) relative to the engine, with the nozzle outlet opening out substantially upwards.

BRIEF DESCRIPTION OF THE DRAWING

Other aspects, characteristics, and advantages of the invention appear from the following description which refers to the accompanying drawing and illustrates, without any limiting character, preferred embodiments of the invention:

FIG. 1 is a perspective view of the power plant on a twin-engine helicopter in which, for each turboshaft engine, the air inlet body is substantially in a high position above the turboshaft engine, and the nozzle from said turboshaft engine is directed substantially laterally outwards from the helicopter; and FIG. 2 is a perspective view of the power plant in a second variant in which the air inlet body of each turboshaft engine is substantially in a lateral position towards the outside of the helicopter, relative to the corresponding turboshaft engine, with each nozzle being directed substantially upwards.

MORE DETAILED DESCRIPTION

In the drawings, in which identical or similar elements are designated by the same reference numerals, there can be seen three mutually orthogonal directions.

A Z direction referred to as elevation or vertical, corresponds to the height or the vertical dimension of the members described. The terms high/low or bottom/top are relative thereto.

Another direction X is referred to as longitudinal or horizontal, and corresponds to the length or main dimension of the members described. The terms front/rear are relative thereto.

Another direction Y is said to be transverse or horizontal, and corresponds to the width or the lateral dimension of the members described. The term side is relative thereto.

The directions X and Y define a horizontal X,Y plane. The directions X and Z define a longitudinal (and vertical) X,Z plane. The directions Y and Z define a transverse (and vertical) Y,Z plane.

In FIG. 1, the rotary wing aircraft 1 is a helicopter comprising a fuselage 2 of which only the portion in front of the tail boom is shown, a main rotor 3 provided with a plurality of blades 4 and driven by a rotor shaft 6 that is substantially vertical by means of a hub 5. The rotor shaft 6 is itself rotated by means of an MGB 7.

In this example, the helicopter has two engines, each power plant 18 comprising a turboshaft engine 8 disposed behind the MGB 7 and substantially parallel to the longitudinal axis X of the helicopter, on a support platform 9 of the helicopter, and includes a drive shaft or power transmission shaft 10 connected to the corresponding free turbine 11. Naturally, the invention applies regardless of the number of turboshaft engines installed on the helicopter.

Each drive shaft or power transmission shaft 10 generally passes through the hot gas exhaust nozzle 15 and rotates gearing internal to the MGB 7 so as to drive the rotor shaft 6.

Consequently, feeding each engine 8 both with fuel and with air activates the gas generator 30 behind the free turbine 11 along the longitudinal axis X so as to set the free turbine into rotation together with its drive shaft 10, the shaft of the gas generator and the drive shaft of the free turbine (or drive turbine) being independent.

Each free turbine is thus located beside the MGB, whereas the air supplied to each engine is taken from the rear of the corresponding engine, along a longitudinal axis X by means of an air inlet body 20.

Advantageously, the air inlet body 20 is substantially parallel to the corresponding engine so that firstly its first end 21 opening out into the ambient atmosphere is situated in front of the hot gas exhaust nozzle 15, substantially in the transverse Y,Z plane containing the axis of the rotor 6 of the helicopter 1, and secondly its second end 22, corresponding to where it is secured to the engine 8, is situated substantially level with the rearmost zone of the engine in the longitudinal direction X.

Furthermore, and advantageously, the second end 22 constitutes a plenum chamber 23 for the drawn-in air, and is substantially annular in shape so as to surround the engine and its own air inlet orifice.

In FIG. 1, as in FIG. 2, it can be seen that the length L of the air inlet body 20 is much longer than usual, being greater than the length l of the engine fitted therewith.

Similarly, it can happen that the distance d between the end 21 of the air inlet body 20 that opens out into the ambient atmosphere in front of the hot gas exhaust nozzle 15, and the outlet 16 from said nozzle is of the order of 1.5 m for an engine installed on a helicopter weighing about 3 tonnes to 15 tonnes, for example. Advantageously, the distance d is thus of the same order of magnitude as the length l of the engine.

The characteristic values for the length L and for the distance d as defined above serve to minimize or even eliminate any risk of recirculation of the kind that used to be present.

Furthermore, since the volume flow rate of air is greater at the outlet 16 from the hot gas exhaust nozzle 15, mainly because of the high ejection speed of said gas, the hot gas flow section in the nozzle is greater than the section of the air inlet body 20, thereby minimizing head losses and consequently avoiding degrading the performance of the engine.

Consequently, the air inlet body is such that:
- its drawn-in air flow section is small, since the inlet speed of the air remains relatively low; and
- the temperature of the drawn-in air is that of the ambient atmosphere, thus avoiding heating the air inlet body, and, also avoiding recurrent vibration, and consequently avoiding cracks and breaks occurring.

Consequently, such an air inlet body 20 is an element that is subjected to little mechanical stress, and is therefore very strong and very reliable. In other words, the reliability of the air inlet body is not less than that of the engine for which it is intended.

As a result, the air inlet body may be made using composite materials, e.g. fabric made of glass or analogous materials (carbon, Kevlar®). Thus, there is a significant saving in weight, e.g. of about 50 kilograms (kg) compared with an embodiment made using a metal.

Under such conditions, FIG. 1 shows a first variant of the power plant 18 of a twin-engine helicopter 1 where the air inlet body 20 extends substantially in the longitudinal direction X above the corresponding engine 8 so that the outlet 16 of the nozzle 15 opens out substantially laterally towards the outside of the helicopter 1 along the axis Y, towards positive Y coordinate for the port engine and in the opposite direction for the starboard engine, when the helicopter is a twin-engine helicopter. This disposition improves accessibility to each of the engines and consequently contributes to making maintenance easy. Naturally, the port or starboard position of the nozzle is unimportant if the helicopter is a single-engine type helicopter.

FIG. 2 shows a second variant in which the air inlet body 20 is disposed substantially laterally, still parallel to the axis X, beside the engine, whereas the outlet 16 of the nozzle 15 opens out substantially upwards, i.e. along the vertical axis Z. Naturally, for a twin-engine helicopter, each air inlet body 20 can be substantially parallel to the longitudinal axis X, one to the port side of the port engine, and the other to the starboard side of the starboard engine.

In this variant, it is also possible to envisage placing the air inlet body substantially laterally, on the starboard side of the port engine and the air inlet body of the starboard engine on the port side thereof. Under such circumstances, the air inlet bodies of each engine in a twin-engine helicopter are located in a side-by-side position, each on either side of the plane X,Z.

As will readily be understood, the power plant 18 of the invention is applicable regardless of whether the helicopter is a single-engine or a twin-engine helicopter.

Furthermore, whatever the number of engines, the power plant of the invention has each engine confined in an individual compartment that is fireproof, ventilated, and drained. This solution provides a genuine advantage insofar as a single equipment for ventilation or for drainage, for detecting fire, and for combating fire suffices, unlike the configuration corresponding to interposing fire walls, e.g. between the gas generator and the free turbine, between the turbine and the hot gas exhaust nozzle, .... The immediate consequence is thus a saving in weight and in expense.

Naturally, the present invention is capable of numerous variations concerning the manner in which it is implemented. Although several embodiments are described above, it will readily be understood that it is not possible to identify exhaustively all possible embodiments. Naturally, it is possible to envisage replacing any of the means described by equivalent means without going beyond the ambit of the present invention.

What is claimed is:

1. A power plant (18), comprising:
   at least one turboshaft engine (8) for driving a main rotor (3) of a rotary wing aircraft (1) via a main gearbox (7) and a rotor shaft (6), the engine (8) being disposed substantially in a longitudinal direction, lying on or parallel with the longitudinal axis X of the aircraft (1) and behind the main gearbox (7) relative to the longitudinal direction of axis X,
   wherein the main gearbox (7) is driven in rotation by a power transmission shaft (10) connected to a free turbine (11) of the engine (8),
   the free turbine (11) is driven in rotation by the gas generator (30) of the engine (8), which is fed with air via an air inlet body (20),
   the hot gas is exhausted via a nozzle (15), and
   said air inlet body (20) is substantially parallel to the engine (8) and has a first end (21) defining an air inlet exposed to ambient atmosphere in front of the hot gas exhaust nozzle (15), the air inlet being substantially in a transverse Y,Z plane containing the rotor shaft (6) of the main rotor (3), and a second end (22) connected to the engine (8) at a rearmost zone of the engine (8) that is rearmost relative to the longitudinal direction X.

2. A power plant according to claim 1, wherein the air inlet body (20) is elongate and of length L greater than a length l of the engine (8).

3. A power plant (18) according to claim 1, wherein the second end (22) of the air inlet body (20) is a plenum chamber (23) for the drawn-in air, that is substantially annular in shape so as to surround said engine (8).

4. A power plant (18) according to claim 1, wherein a distance d between the first end (21) of the air inlet body and the outlet (16) of the hot gas exhaust nozzle (15) is of the order of 1.5 m.

5. A power plant (18) according to claim 1, wherein the distance d between the first end (21) of the air inlet body and the outlet (16) of the hot gas exhaust nozzle (15) is substantially equal to the length l of the engine.

6. A power plant (18) according to claim 1, wherein an air flow section of the air inlet body (20) is less than a hot gas flow section of the nozzle (15).

7. A power plant (18) according to claim 1, wherein the air inlet body (20) is made of composite materials.

8. A power plant (18) according to claim 1, wherein the air inlet body (20) is situated above the engine (8), and the outlet (16) from the hot gas exhaust nozzle (15) opens laterally outwards from the helicopter (1), being substantially parallel to the transverse axis Y, either towards positive Y coordinates, or towards negative Y coordinates.

9. A power plant (18) according to claim 1, wherein the air inlet body (20) is situated substantially laterally, beside the engine (8), and wherein the outlet (16) from the hot gas exhaust nozzle (15) opens out substantially towards positive Z coordinates.

10. A power plant (18) according to claim 1, wherein each power plant (18) is disposed in an individual compartment containing a single engine (8) and a single piece of equipment for ventilation, drainage, detecting fire, and combating fire.

11. A power plant (18) comprising:
   two turboshaft engines (8) for driving a main rotor (3) of a rotary wing aircraft (1) via a main gearbox (7) and a rotor shaft (6), the engines (8) being disposed substantially in a longitudinal direction, lying parallel with the longitudinal axis X of the aircraft (1) and behind the main gearbox (7) relative to the longitudinal direction of axis X,
   wherein the main gearbox (7) is driven in rotation by a respective power transmission shaft (10) connected to a free turbine (11) of the engines (8),
   the free turbine (11) is driven in rotation by the gas generator (30) of the engines (8), each of the engines (8) has only a single respective air inlet body (20) for feeding air thereto, the hot gas is exhausted via a nozzle (15), and each said air inlet body (20) is substantially parallel to the engines (8) and has a first end (21) with an air inlet in front of the hot gas exhaust nozzle (15) and substantially in a transverse Y,Z plane containing the rotor shaft (6) of the main rotor (3), and a second end (22) connected to a respective one of the engines (8) at at a rearmost zone of the respective engine (8) that is rearmost relative to the longitudinal direction X.

12. A power plant according to claim 11, wherein a port one of the engines (8) is fed air from a first said air inlet body (20) disposed to a port side of the port engine and a starboard one of the engines (8) is fed air from a second said air inlet body (20) disposed to a starboard side of the starboard engine, and body (20) disposed to a starboard side of the port engine and a starboard one of the engines (8) is fed air from a second said air inlet body (20) disposed to a port side of the starboard engine.

\* \* \* \* \*